United States Patent [19]

Tietjen

[11] 4,450,541

[45] May 22, 1984

[54] BIAS COMPENSATED OPTICAL GRATING HYDROPHONE

[75] Inventor: Byron W. Tietjen, Liverpool, N.Y.

[73] Assignee: General Electric Company, Syracuse, N.Y.

[21] Appl. No.: 336,252

[22] Filed: Dec. 31, 1981

[51] Int. Cl.³ .......................................... H04R 23/00
[52] U.S. Cl. .................................... 367/149; 367/172
[58] Field of Search ............... 367/166, 167, 140, 141, 367/149, 153, 155, 156, 157; 350/96.15, 96.29, 96.19; 310/337; 332/7.51

[56] References Cited

U.S. PATENT DOCUMENTS

| | | | |
|---|---|---|---|
| 1,101,830 | 6/1914 | Berger | 367/153 |
| 3,198,061 | 8/1965 | Hock | 356/373 |
| 3,482,105 | 12/1969 | Hutzler | 250/226 |
| 3,990,035 | 11/1976 | Byers | 367/141 |
| 4,091,281 | 5/1978 | Willhelm et al. | 250/237 |
| 4,124,280 | 11/1978 | Berg et al. | 350/358 |
| 4,208,736 | 6/1980 | Babikyan | 367/153 |
| 4,297,887 | 11/1981 | Bucaro | 367/140 |

OTHER PUBLICATIONS

Tehon, S. et al., "High Dynamic Compliance Hydrophone with Hydrostatic Pressure Balancing", U.S. patent application, Ser. No. 328,335, filed Dec. 7, 1981, assigned to General Electric Co.

Spillman, W. B. et al., "Moving Fiber-Optic Hydrophone", *Optics Letters*, vol. 5, No. 1, Jan. 1980, Optical Society of America, pp. 30-31.

Spillman, W. B. et al., "Schlieren Multimode Fiber-Optic Hydrophone", *Applied Physics Letters* 37(2), Jul. 15, 1980, American Institute of Physics, pp. 145-147.

Tietjen, B. W., "The Optical Grating Hydrophone", *Journal of the Acoustical Society of America*, Apr. 1981, pp. 993-997.

Jackson, "An Intensity Modulated Optical Hydrophone", Eastcon 1980, IEEE Meeting, pp. 42-46.

*Primary Examiner*—Harold J. Tudor
*Assistant Examiner*—Tyrone Davis
*Attorney, Agent, or Firm*—Carl W. Baker; Richard V. Lang

[57] ABSTRACT

An optical grating hydrophone employs a dual grating construction and two pairs of optical fibers to provide a reliable output signal without the need for mechanically adjusting the system bias. A bias compensation circuit selects the output signal to be received based upon the output signals from the two optical cable pairs.

9 Claims, 6 Drawing Figures

BIAS COMPENSATED OPTICAL GRATING HYDROPHONE

BACKGROUND OF THE INVENTION

This invention relates to optical grating hydrophones, and, more particularly, to a bias compensation technique for optical grating hydrophones.

An optical grating hydrophone is a device employed to convert time varying acoustic waves under water into optical signals, which can be used for detection of a sound source within the water. The hydrophone includes two optical waveguides (such as light fibers) in axial alignment with a narrow gap separating their ends. The optical grating hydrophone utilizes a pair of gratings located in the gap between the optical waveguides, which consist of equal width opaque and transparent stripes as a controllable aperture between the waveguides. When the opaque stripes of one grating coincide with the transparent stripes of the other grating the net transparent area is zero. When the transparent stripes of both of the gratings coincide, the net transparent area is at the maximum, one half the total area. The optical transmission from one waveguide to the other, therefore, varies from 0–50%. An acoustic signal received by a compliant part of the hydrophone supporting one of the gratings moves that one grating with respect to the other, which results in the modulation of the intensity of a light beam passing through the gratings. Such hydrophone systems require a static setting of the gratings relative to each other, the bias of the system, which establishes the light beam intensity when no acoustic wave is being received. This intensity is the base line against which the light beam intensity is measured to determine the characteristics of the received acoustic wave. To properly interpret the intensity modulation produced by a received acoustic wave, the bias must be within a known range. Especially in an array of hydrophones, where different biases occur from hydrophone to hydrophone as a result of manufacturing tolerances and operating parameters, some technique for bias compensation is very important. For the information produced by the intensity modulation to be useful, each hydrophone must be operating in a linear region of the transfer function which relates the received acoustic signal to the output optical signal. Mechanical adjustment of each pair of gratings to establish a common bias is especially difficult when high density gratings are used, since the small dimensions of the grating stripes require a very fine adjustment. This limits the applicability of this type of intensity modulated optical hydrophones to small arrays.

SUMMARY OF THE INVENTION

Accordingly, an object of the present invention is to provide an optical grating hydrophone construction and accompanying circuitry to provide a bias compensation technique for an optical grating hydrophone.

The optical grating hydrophone of the present invention includes a two-chambered housing having a pair of light sources entering one chamber of the hydrophone and a pair of detectors in optical alignment with respective ones of the sources. A pair of optical gratings is disposed in optical alignment with each source-detector pair to modulate the light beam passing between each source-detector pair. The optical gratings are so constructed that the intensity of the light beam received by one of the two detectors will always be linearly related to the intensity of a received acoustic wave. A compensating circuit is provided to determine which of the source-detector pairs is operating in the linear region.

BRIEF DESCRIPTION OF THE DRAWINGS

The features of the invention believed to be novel and unobvious over the prior art are set forth with particularity in the appended claims. The invention itself, however, as to organization, method of operation and the best mode contemplated, together with further objects and advantages may best be understood by reference to the following description taken in conjunction with the accompanying drawings, in which like reference characters refer to like elements throughout, and in which:

DESCRIPTION OF THE PREFERRED EMBODIMENTS

Figure 1:
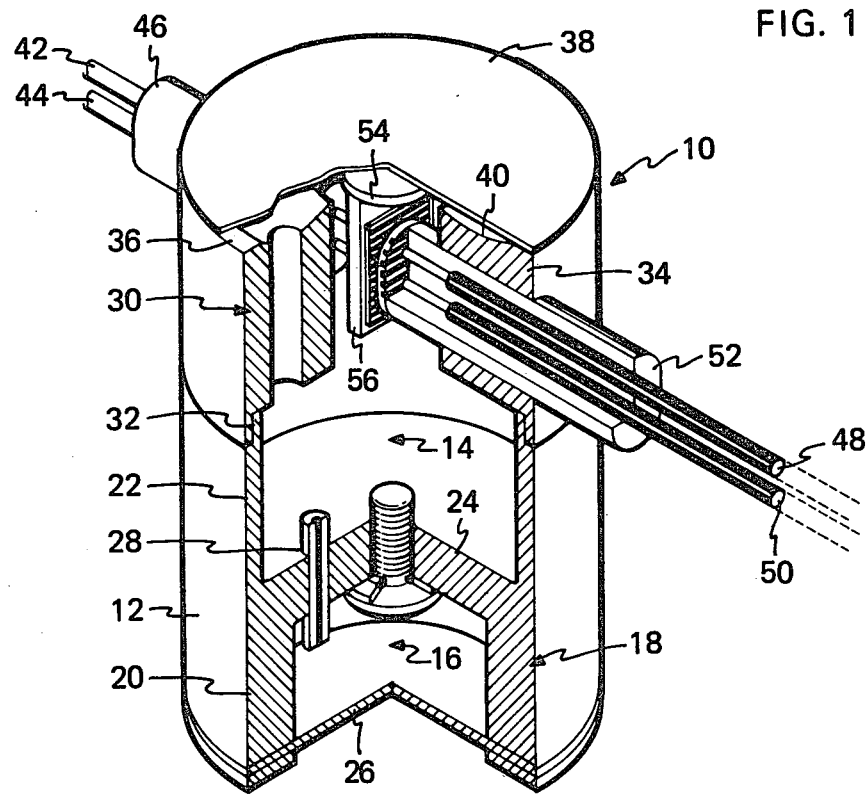
FIG. 1 is a schematic pictorial view of the present invention with parts shown in cross section.

FIG. 1 illustrates a pressure sensitive optical grating hydrophone 10 built according to the present invention. Hydrophone 10 includes a housing 12 divided into chambers 14 and 16. The housing 12 includes an outer cylindrical wall 18 having a thick walled section 20, a thinner walled section 22 and a plate 24 located between the thick walled and thin walled sections and dividing the interior space of the housing. The housing is closed at one end by a flexible member 26, made of, for example, rubber. The chambers 14 and 16 are filled with a fluid, such as castor oil, which has suitable light transmission properties. The pressure inside the hydrophone is equalized to the outside pressure by flexible member 26. A capillary tube 28 is inserted through the dividing plate 24 to provide pressure equalization between the two chambers. The opposite end of the housing is closed by a cylindrical cap 30 fitted to the wall 22 at a circumferential notch 32. Cap 30 includes a thick walled ring 34 tapered inwardly from a shoulder 36 to which a flexible diaphragm 38 is attached. The taper of the wall 34 provides a gap between the diaphragm 38 and the surface 40 to allow vertical motion of the diaphragm. A pair of light conductors 42, 44, which serve as light sources, pass through the ring 34 and are supported by a light conductor terminator 46 which supports the light conductors 42, 44 within the hydrophone. A second pair of light conductors 48, 50, which serve as light receivers, pass through ring 34 and are supported by a light conductor terminator 52 to be in optical alignment with light conductors 42, 44, respectively. The ends of the light conductor terminators 46, 52 are spaced to have an axial gap therebetween.

Figure 2:
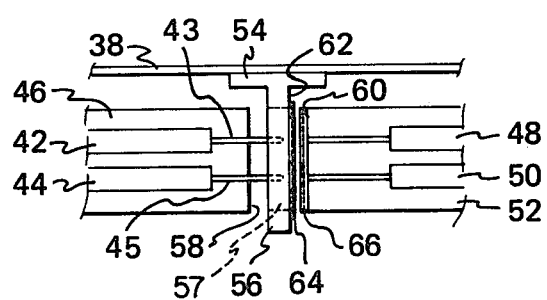
FIG. 2 is an enlarged schematic diagram of the grating structure of the present invention.

Positioned in the gap between the respective ends of the light conductor terminators 46 and 52 is a grating support structure, as shown in FIG. 2, which includes a disc 54 attached to the diaphragm 38 by, for example, adhesive, and a vertical support member 56 extends between the end 58 of the terminator 46 and the end 60 of the terminator 52. Support member 56 includes opening 57 for transmission of light beams 43, 45 therethrough, and attached to one surface 62 of support member 56 is a first optical grating 64, and attached to surface 60 of terminator 52 is a second optical grating 66.

Figure 3:
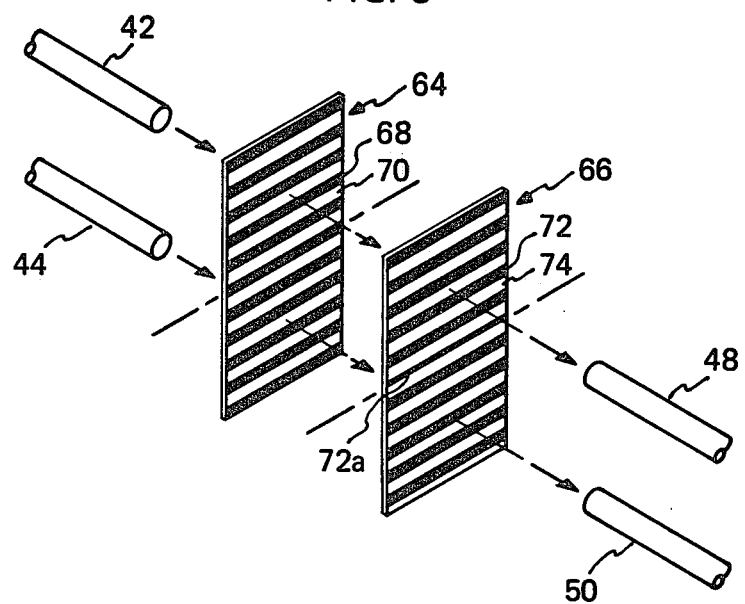
FIG. 3 is a diagrammatic view of the grating structure of the present invention.
Figure 4:
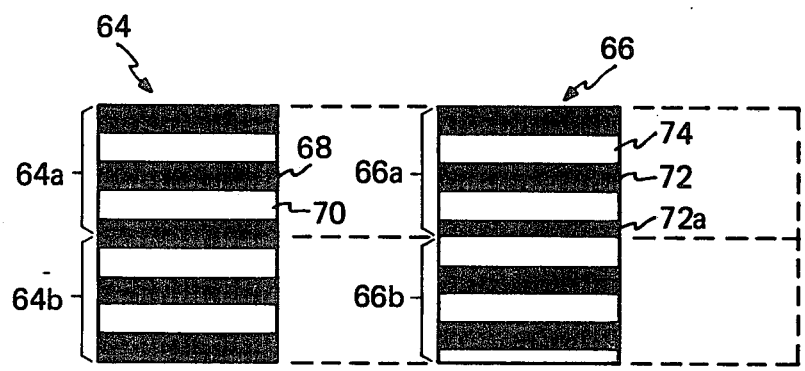
FIG. 4 is a diagrammatic illustration of the grating structure of the present invention showing the structural relationship of the two gratings.

The optical grating pairs of the present invention are shown greatly enlarged in FIGS. 3 and 4. Grating 64 comprises a series of alternating opaque stripes 68 and transparent stripes 70 and is divided into upper and lower gratings 64a and 64b as shown in FIG. 4. Grating 66 comprises alternating opaque stripes 72 and transparent stripes 74 and is divided into individual gratings 66a and 66b. The opaque stripe 72a at the center of grating 66 has a vertical dimension of approximately half that of the other opaque stripes. The effect of the narrow center stripe 72a is to produce a grating pair 64a, 66a which is spatially shifted 90 degrees with respect to the grating pair 64b, 66b. It will be appreciated by those skilled in the art that the vertical dimension of the opaque and transparent stripes are greatly exaggerated in the figures; a typical vertical dimension would be in the range of 0.001 inches to 0.004 inches.

Figure 5:
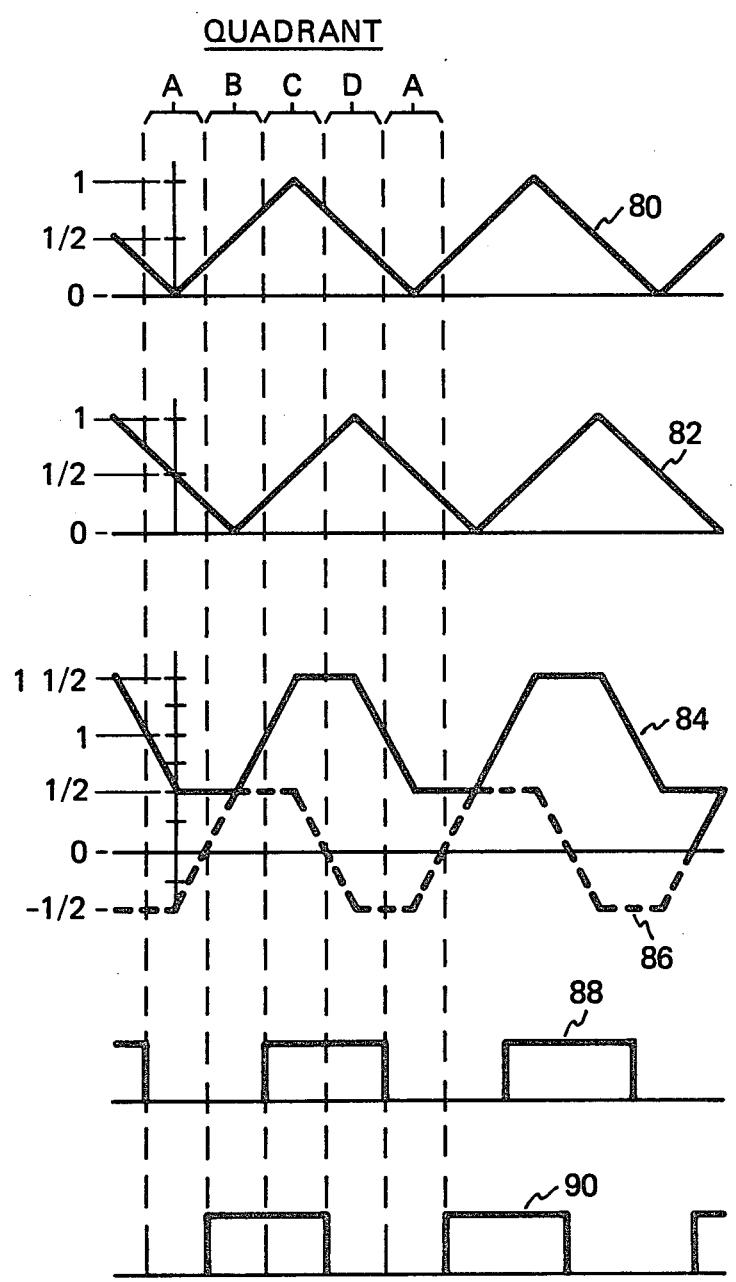
FIG. 5 is a graphical representation of the transfer functions produced by the grating structures of the present invention.

The configuration shown in FIG. 1 employing the grating structure illustrated in FIGS. 3 and 4 provides two optical channels, the first using fibers 42 and 48, and the second using fibers 44 and 50 as shown in FIG. 3. The 90 degree shift of grating 66b relative to grating 64b produces a 90 degree phase shift in the optical transfer functions of the two optical channels. The light intensity transfer function for each grating pair is defined as the amount of light transmitted through the grating pair as a function of the relative spatial displacement of the gratings of the grating pair. With transparent and opaque stripes of equal width, maximum transmission occurs when the transparent and opaque stripes exactly overlap, so that by establishing this as 100 percent of possible light output, unity corresponds to a beam intensity at one of the light detectors of half the total light incident upon the grating pair from the optical source. The transfer functions are illustrated in FIG. 5, in which relative displacement of the gratings of a grating pair is along the horizontal axis and light output received by the detector is along the vertical axis for each trace with unity representing maximum transmission. The transfer function for optical channel a of the grating pair 64a, 66a is shown by trace 80. The transfer function for optical channel b of the grating pair 64b, 66b is shown by trace 82. As shown by the displacements of the minimums of the two transfer functions, the outputs are shifted 90 degrees relative to each other. The sum of the outputs is shown at 84 and the difference is 86. The optical transfer functions can be divided into four basic quadrants A, B, C and D, which then repeat.

In order to avoid fringing effects which interfere with the transfer function, it is highly desirable to operate in the linear regions of the transfer functions; e.g., quadrant B or D of transfer function 80 of grating pair 64a, 66a, and quadrant A or C of transfer function 82 of grating pair 64b, 66b. This bias point may reside within any of the four quadrants. If knowledge can be gained of the quadrant in which the system is operating (i.e., where the bias point is located), then compensation for the bias can readily be made. For example, it may be assumed that it is desirable to operate at, or near, the center of the positive slope of the optical transfer function. If it is determined that the bias is located in quadrant B, then all that is required is to choose the signal in channel a. Similarly, if it is determined that the bias is located in quadrant C, then channel b would be preferred. If it is determined that bias resides in quadrant A, the inverse in the signal in channel b would be used; and if the bias were determined to be located in quadrant D, the inverse of the signal in channel a would be preferred. Employing this selection of signals will ensure that the hydrophone is always operating at a bias level of 50 percent plus or minus 25 percent of maximum output intensity and that the output will always have the same phase relationship to the acoustic wave input to the hydrophone, i.e., that the output signal amplitude will increase with increasing amplitude of the incident acoustic wave. By comparing the sum signal 84 with a threshhold value corresponding to unity (i.e., the level corresponding to half of the total light incident upon one set of gratings) and producing a signal whenever the sum exceeds 1, the comparator output shown at 88 is provided. By comparing the difference signal 86 with a threshhold value of 0 and producing a signal whenever the difference is greater than 0, the output signal shown at 90 is obtained. By comparing the outputs 88 and 90 the preferred quadrant of operation can be identified. As shown in FIG. 5, if both the sum comparator output 88 and difference comparator output signal 90 are low, the hydrophone is operating in quadrant A. If the comparator output 88 is low and the comparator output 90 is high, the hydrophone is operating in quadrant B. If both outputs 88 and 90 are high, the system is operating in quadrant C, and if the comparator output 88 is high, and the comparator output 90 is low, the system operates in quadrant D. This selection of quadrant provides a determination of which signal a, signal b, the inverse of signal a and the inverse of signal b may be used as the output signal for the hydrophone.

Figure 6:
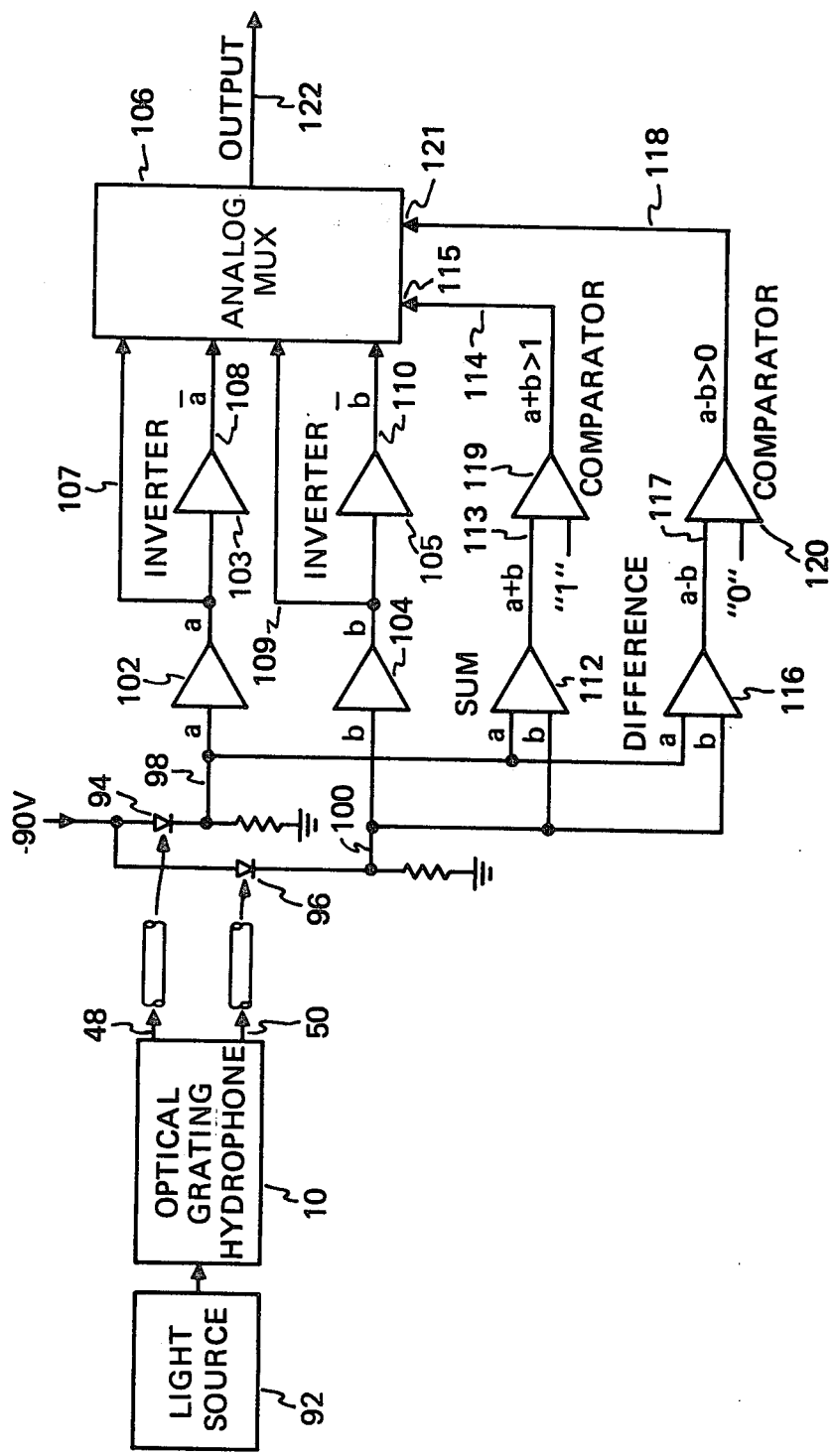
FIG. 6 is a circuit diagram of a bias compensation circuit of present invention.

The circuitry for accomplishing this signal processing is shown schematically in FIG. 6. A light source 92 provides light inputs to the hydrophone 10. Photo detectors 94, 96 provide modulator output signals 98 and 100 for light channels a and b, respectively, representative of the intensity of light output by each receiver after modulation by the grating pair in the associated light channel a or b. Signals 98 and 100 are input to amplifiers 102, 104, respectively, and the amplified output signals 107, 109 are input to analog multiplexer 106. Signals 107, 109 are input to inverters 103, 105, respectively, and the inverted output signals 108, a, and 109, b, are input to the multiplexer 106. The signals 98 and 100 are also input to a summer 112 and the sum 113 compared with a reference voltage by comparator 119 to provide an output 114 to the multiplexer control input 115 if the sum is greater than the reference voltage; i.e., the signal shown at 88 on FIG. 5. The difference of output signals 98 and 100 is produced in a comparator 116, and the difference signal 117 is compared to a reference voltage 0 in comparator 120. If the difference signal 117 is greater than the reference voltage 0, a control signal 118 is provided to the multiplexer 106 from the difference comparator 120; i.e. the signal shown at 90 in FIG. 5. These two control signals 114, 118 determine which of inputs 107, 108, 109 or 110 is provided as output signal 122 to a detector to indicate the presence of an acoustic wave. The detector will receive signals from each hydrophone in an array of hydrophones to provide sensing covering an area larger than that which can be monitored by a single hydrophone. Each hydrophone will provide a reliable output regardless of the quadrant of its operation, since the compensation circuit determines which quadrant will produce a useful output.

Although dimensions for a hydrophone may vary widely typical dimensions are a diameter of 2 inches and a total length of 2⅜ inches. Typical optical fiber size is 400 micrometers in diameter. A variety of compensation circuits may be employed, so long as the compensation function is accomplished. Further modifications in the optical system can be made within the concept of the present invention. For example, a single optical fiber could provide an input to the hydrophone with a beam splitter, such as a prism, located within the hydrophone to provide two optical sources. Locating the beam splitter within the hydrophone would add only a small complication. As will be appreciated by those skilled in the art other modifications to the specific features of the present invention may be made within the scope of the present disclosure.

I claim:

1. A hydrophone comprising:
   a housing including a chamber closed by acoustic wave sensing means movable in response to an acoustic wave incident thereon;
   means disposed within said chamber for transmitting first and second light beams therein;
   first and second light beam receiving means disposed within said chamber and having said first and second light beams respectively directed thereon;
   first intensity modulating means comprising a first pair of optical gratings of which one is coupled to said acoustic wave sensing means for movement in accordance with motion thereof and the other is relatively fixed so as not to move with motion of said acoustic wave sensing means, the gratings of said first grating pair being in optical alignment with each other and with said first light beam whereby that beam as received at said first light beam receiving means is modulated in intensity in accordance with relative movement of the gratings resulting from motion of said acoustic wave sensing means;
   second intensity modulating means comprising a second pair of optical gratings one of which is coupled to said acoustic wave sensing means for movement in accordance with motion thereof and the other is relatively fixed so as not to move with motion of said acoustic wave sensing means, the gratings of said second grating pair being in optical alignment with each other and with said second light beam whereby that beam as received at said second light beam receiving means is modulated in intensity in accordance with relative movement of the gratings resulting from motion of said acoustic wave sensing means, the two gratings of said second grating pair being positioned relative to each other with a spatial displacement of 90 degrees from the relative position of the two gratings of said first grating pair whereby the modulation of said second beam by said second grating pair is phase displaced by 90 degrees with respect to the modulation of said first beam by said first grating pair;
   first and second photodetector means respectively connected to said first and second beam receiving means for detecting said first and second light beams as modulated by the grating pair through which each beam is received at its respective receiving means, to provide first and second modulator output signals respectively representative of the modulated intensities of said first and second light beams; and
   a detector circuit including means responsive to said first and second modulator output signals to select the one thereof then within a linear region of its modulation and to derive from the signal thus selected a hydrophone output signal representative of the amplitude of the incident acoustic wave.

2. The hydrophone of claim 1 wherein said detector circuit comprises;
   first output circuit means for receiving said first modulator output signal and converting the same into a first electrical output signal;
   first inverter means for inverting said first electrical output signal to provide a second electrical output signal;
   second output circuit means for receiving said second modulator output signal and converting the same into a third electrical output signal;
   second inverter means for inverting said third electrical output signal to provide a fourth electrical output signal;
   a multiplexer for receiving said first, second, third and fourth electrical output signals; and
   circuit means for controlling the output of said multiplexer to select as a multiplexer output signal that one of said first, second, third or fourth electrical output signals the amplitude of which is then between 25 and 75 percent of maximum and increasing with increasing amplitude of the incident acoustic wave.

3. The apparatus of claim 2 wherein said circuit means for controlling said output of said multiplexer comprises:
   circuit means for providing a sum signal of said first and third electrical output signals;
   circuit means for providing a difference signal of said first and third electrical output signals; and
   circuit means for comparing said sum and difference signals with respective reference signals to provide output control signals to said multiplexer to control the multiplexer output signal.

4. The apparatus of claim 1, wherein said intensity modulating means further comprise first and second grating support members one of which is connected to said acoustic wave sensing means for movement therewith and one is fixed with respect to said housing, and wherein a first grating of each of said grating pairs is attached to said first support member and the second grating of each grating pair is attached to said second support member, with the gratings of the two grating pairs being so positioned on their respective support members that when light passed by one grating pair is at a maximum light passed by the other is at 50 percent of maximum.

5. The apparatus of claim 1, wherein said modulator output signal selection means includes reference voltage comparator means for determining which of said modulation output signals is between 25 percent and 75 percent of its maximum and deriving said hydrophone output signal therefrom.

6. The apparatus of claim 4 wherein:
   said second grating of said first pair of gratings is disposed upon one of said grating support members at a position spatially displaced 90 degrees from said second grating of said second pair of gratings; and said first grating of said first pair of gratings and said first grating of said second pair of gratings together form a single uniform grating disposed upon the other of said grating support members.

7. A method for detecting acoustic waves comprising the steps of:

transmitting first and second input light beams through a hydrophone;

modulating the intensity of said first input light beam in accordance with a received acoustic wave to produce a first modulated output light beam;

modulating the intensity of said second input light beam in accordance with said received acoustic wave to produce a second modulated output light beam the modulation of which has a 90 degree phase displacement with respect to said first output light beam;

detecting each of said first and second output light beams;

converting said first output light beam into a first electrical output signal;

converting said second output light beam into a second electrical output signal; and selecting as an output signal indicative of the presence of an acoustic wave the one of said first and second electrical output signals which is then within a linear region of its modulation.

8. The method of claim 7 wherein the first modulating step comprises:

impinging said first input beam upon a first grating pair having a first bias position at rest; one grating of said first grating pair being moved by an acoustic wave sensitive diaphragm in said hydrophone in response to a received acoustic wave; and the second modulating step comprises:

impinging said second input beam upon a second grating pair having a second bias position at rest; one grating of said second grating pair being moved by an acoustic wave sensitive diaphragm in said hydrophone in response to a received acoustic wave; said second bias position being mechanically offset from said first bias position by a 90 degree spatial displacement whereby the modulation of said second output light beam is given said 90 degree phase displacement with respect to the modulation of said first output light beam.

9. The method of claim 8 wherein the step of selecting one of said first and second electrical output signals comprises:

inverting said first electrical output signal to produce a third electrical output signal;

inverting said second electrical output signal to produce a fourth electrical output signal;

simultaneously providing said first, second, third and fourth electrical output signals to an output multiplexer;

summing said first and second electrical output signals to produce a sum signal;

comparing said first and second electrical output signals to produce a difference signal;

comparing said sum signal to a first reference signal to produce a first output control signal;

comparing said difference signal to a second reference signal to produce a second output control signal; and controlling the output signal from said multiplexer by said first and second output control signals, so that one of said first, second, third and fourth electrical output signals is output by said multiplexer.

* * * * *